US011623501B2

(12) United States Patent
Heidan et al.

(10) Patent No.: US 11,623,501 B2
(45) Date of Patent: Apr. 11, 2023

(54) DRIVE SYSTEM FOR A MOVABLE ROOF PART OF A ROOF MODULE OF A MOTOR VEHICLE

(71) Applicant: BOS GmbH & Co. KG, Ostfildern (DE)

(72) Inventors: Michael Heidan, Dietzenbach (DE); Marius Marquart, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 5 days.

(21) Appl. No.: 17/421,788

(22) PCT Filed: Dec. 30, 2019

(86) PCT No.: PCT/EP2019/087173
§ 371 (c)(1),
(2) Date: Jul. 9, 2021

(87) PCT Pub. No.: WO2020/144080
PCT Pub. Date: Jul. 16, 2020

(65) Prior Publication Data
US 2022/0089007 A1    Mar. 24, 2022

(30) Foreign Application Priority Data
Jan. 11, 2019    (DE) .......................... 102019200267.6

(51) Int. Cl.
*B60J 7/043*    (2006.01)
*B60J 7/057*    (2006.01)

(52) U.S. Cl.
CPC ............. *B60J 7/0573* (2013.01); *B60J 7/043* (2013.01)

(58) Field of Classification Search
CPC ... B60J 7/02; B60J 7/043; B60J 7/0435; B60J 7/057; B60J 7/0573; B60J 7/05; B60J 7/053
(Continued)

(56) References Cited

U.S. PATENT DOCUMENTS 5,580,123 A * 12/1996 Ochiai .................. B60J 7/053
296/223
6,309,014 B1    10/2001 Adam et al.
(Continued)

FOREIGN PATENT DOCUMENTS

CN    101391573 A    3/2009
CN    103347723 A    10/2013
(Continued)

OTHER PUBLICATIONS

International Search Report with English Translation issued in corresponding International Application No. PCT/EP2019/087173 dated Apr. 3, 2020 (8 pages).

*Primary Examiner* — Dennis H Pedder
(74) *Attorney, Agent, or Firm* — Flynn Thiel, P.C.

(57) ABSTRACT

A drive system including a guide rail assembly fixed to a roof module and including a control mechanism movable in the guide rail assembly and operatively connected to the roof part in order to move the moveable roof part between a closed position, a ventilation position, and an open position. The control mechanism has a drive slide connected to a drive transmission section. A tilting claw is provided on the drive slide, and a wall section of the guide rail assembly is provided with at least one latching profiled section positioned in the region of the guide rail assembly and facing the drive slide. The drive slide is positioned in the guide rail assembly region in the open position of the moveable roof
(Continued)

part, and interacts with the tilting claw in a form-fitting manner when the drive slide is tilted.

8 Claims, 13 Drawing Sheets

(58) Field of Classification Search
USPC .................. 296/216.02–216.5, 223, 224
See application file for complete search history.

(56) References Cited

U.S. PATENT DOCUMENTS

| | | | |
|---|---|---|---|
| 7,810,879 | B2 | 10/2010 | Nakamura |
| 8,371,644 | B2 | 2/2013 | Faerber |
| 8,740,296 | B2 | 6/2014 | Ohdoi et al. |
| 9,493,059 | B2 | 11/2016 | Heidan et al. |
| 9,834,075 | B2 | 12/2017 | Heidan et al. |
| 9,845,002 | B2 | 12/2017 | Nellen |
| 2015/0048655 | A1 | 2/2015 | Heidan et al. |
| 2017/0043650 | A1 | 2/2017 | Nellen |
| 2017/0259651 | A1 | 9/2017 | Stapler |
| 2018/0009296 | A1* | 1/2018 | Heidan .................. B60J 7/024 |
| 2018/0326822 | A1 | 11/2018 | Heidan |

FOREIGN PATENT DOCUMENTS

| | | |
|---|---|---|
| CN | 105522900 A | 4/2016 |
| CN | 106427503 A | 2/2017 |
| CN | 107428230 A | 12/2017 |
| CN | 108859696 A | 11/2018 |
| CN | 113329897 A | 8/2021 |
| DE | 19836853 C1 | 3/2000 |
| DE | 10023314 C1 | 8/2001 |
| DE | 102004003911 A1 | 8/2005 |
| DE | 202007012126 U1 | 1/2008 |
| DE | 102009013105 A1 | 9/2010 |
| DE | 102011015833 A1 | 10/2012 |
| DE | 202014103089 U1 | 11/2015 |
| DE | 102015201587 A1 | 8/2016 |
| DE | 102016203131 A1 | 8/2017 |
| DE | 102016108100 A1 | 11/2017 |
| DE | 102016119451 A1 | 4/2018 |
| DE | 102017204489 A1 | 9/2018 |
| EP | 1044837 B1 | 10/2000 |
| EP | 3138711 A2 | 3/2017 |
| EP | 3219528 A1 | 9/2017 |
| JP | 5938114 U | 3/1984 |
| KR | 20020076916 A | 10/2002 |
| WO | 2013164056 A1 | 11/2013 |
| WO | 2014154383 A2 | 10/2014 |
| WO | 2016120193 A1 | 8/2016 |

* cited by examiner

DRIVE SYSTEM FOR A MOVABLE ROOF PART OF A ROOF MODULE OF A MOTOR VEHICLE

TECHNICAL FIELD

The invention relates to a drive system for a movable roof part of a roof module of a motor vehicle having a guide rail arrangement which is fixed to a roof module, having a control mechanism which is movable in the guide rail arrangement and, for shifting the movable roof part between a closed position, a ventilation position and an open position, is operatively connected to the roof part and which has a drive carriage which is connected to a drive transmission train.

A drive system of this type is known from DE 10 2015 201 587 A1. The known drive system is part of a roof module which is fitted as a premanufactured construction unit into a cut-open roof region of a passenger vehicle. The roof module has a carrier frame which is provided on opposite longitudinal sides with a respective guide rail arrangement consisting of a light metal profile. A control mechanism which has a drive carriage which is movable longitudinally in the guide rail arrangement is integrated in each of the two guide rail arrangements. In the mounted state ready for operation, the drive carriage is connected to a drive transmission train in the form of a thread pitch cable which is displaceable forward and rearward along the guide rail arrangement. The thread pitch cable is longitudinally displaceable via a central drive motor which is fastened on the front side in the carrier frame. The central drive motor is an electric motor which displaces the thread pitch cable by means of a transmission. A thread pitch cable is laid in each of the opposite guide rail arrangements, wherein the two thread pitch cables are driven synchronously with respect to each other via the electric motor. In the opposite guide rail arrangement, a control mechanism is provided in the same manner as in the other guide rail arrangement mentioned previously. A synchronous shifting of the two control mechanisms in the opposite guide rail arrangements leads to shifting of a movable roof part between a closed position, a ventilation position and an open position.

It is the object of the invention to provide a drive system of the type mentioned at the beginning which is improved in respect of crash safety.

This object is achieved in that a tilting claw is provided on the drive carriage, and in that a wall portion of the guide rail arrangement is provided with at least one latching profiling which is positioned in a region of the guide rail arrangement and faces the guide carriage, and when the drive carriage is positioned in the open position of the movable roof part, the latching profiling interacts with the tilting claw in a form-fitting manner when the drive carriage is tilted. The solution according to the invention prevents, in the open position of the movable roof part, in the event of a sharp vehicle deceleration, in particular caused by a vehicle impact, the movable roof part from unintentionally sliding forward out of the open position due to the forces of inertia that occur. This reliably prevents the movable roof part, in the event of a sharp vehicle deceleration, from abruptly closing and trapping any limbs of vehicle occupants. In the event of the sharp vehicle deceleration, a sharp acceleration acts on the movable roof part relative to the roof module forward in the closing direction. The solution according to the invention is suitable for different types of roof modules which have at least one movable roof part. Roof modules of this type are spoiler roof modules, tilt and slide modules or roof modules in which the movable roof part is moved in the open position by means of opposite drive systems beyond a stationary roof portion and a respective control mechanism of each drive system is moved along a guide rail arrangement which extends laterally next to the fixed roof portion.

In a refinement of the invention, a carrier strip is provided for the movable roof part, said carrier strip being mechanically coupled to the drive carriage by means of a coupling member which acts eccentrically on the drive carriage in such a manner that, in the installed state of the drive system ready for operation, in the event of a sharp acceleration of the roof part the drive carriage tilts in a direction about its vertical axis, in which the tilting claw interacts with the at least one latching profiling. As a result, in the event of an acceleration of the roof part from the open position in the direction of the closed position, in particular due to a sharp vehicle deceleration, angular momentum about a vertical axis of the drive carriage is produced on the drive carriage, the angular momentum leading to twisting and thus to tilting of the drive carriage within the guide rail arrangement. Accordingly, the coupling member of the carrier strip acts eccentrically with respect to a vertical axis running through the center of gravity of the drive carriage and brings about a torque on the drive carriage in the direction in which the tilting claw is rotated toward an adjacent wall of the guide rail arrangement, on which the at least one latching profiling is located. The tilting of the guide carriage and the form-fitting interlocking of the tilting claw with the at least one latching profiling in the guide rail arrangement causes blocking of the guide carriage, as a result of which the carrier strip is also blocked and the movable roof part is prevented from sliding forward in the direction of the closed position.

In a further refinement of the invention, the tilting claw is configured as a sheet metal insert in a carrier part of the drive carriage, wherein the sheet metal insert protrudes at least in sections out of the carrier part in the longitudinal direction. The sheet metal insert is preferably configured as a steel sheet insert and protrudes forward in the longitudinal direction out of the carrier part—with respect to an installed state of the drive system in the roof region of a passenger vehicle. The carrier part is preferably formed from a plastic as an injection molded part. The tilting claw is preferably designed as a steel sheet angle piece which has sufficient stability against deformation, owing to which the steel sheet insert interacts as a virtually rigid component with the at least one latching profiling. This ensures that a form-fitting connection between the at least one latching profiling and the steel sheet insert is maintained even in the event of high forces of inertia that act forward in the longitudinal direction of the vehicle and act on the movable roof part.

In a further refinement of the invention, the tilting claw protrudes from the carrier part forward in the longitudinal direction—as seen in the orientation of the drive carriage ready for operation. Preferably, the at least one latching profiling is assigned to the tilting claw on the guide rail arrangement on the outer side of the drive carriage and the coupling member of the carrier strip acts on the inner side on the drive carriage. A control cam, which is formed integrally on the carrier strip and interacts with a control track arranged laterally on the drive carriage, is preferably provided as the coupling member.

In a further refinement of the invention, a row of latching teeth oriented in the longitudinal direction of the guide rail arrangement is provided as at least one latching profiling, said latching teeth being formed integrally on the wall portion of the guide rail arrangement. The latching teeth are advantageously shaped in such a manner that corresponding tooth flanks interact forward in the longitudinal direction with the tilting claw in a self-locking manner.

In a further refinement of the invention, a control cam is provided as the coupling member of the carrier strip, said control cam protruding into a control track of the drive carriage, which control track is open toward the carrier strip and is arranged laterally on the carrier part. The control track is open with respect to the drive carriage—toward a side which is opposite that side of the drive carriage on which the at least one latching profiling of the guide rail arrangement is positioned. The control cam of the carrier strip is also positioned—with respect to a vertical longitudinal plane of the drive carriage—opposite the at least one latching profiling of the guide rail arrangement.

In a further refinement of the invention, the control track has at least one channel wall surface which protrudes transversely with respect to a wall of the carrier part that extends in the vertical direction and in the transverse direction, and against which the control cam lies in the open position of the roof part. In the open position of the movable roof part, a portion of said channel wall surface of the carrier part that extends in the vertical direction and in the transverse direction forms a contact surface for the control cam, said contact surface being positioned eccentrically with respect to a vertical axis of the center of gravity of the drive carriage. This gives rise, when the roof part is appropriately longitudinally loaded via the carrier strip and the control cam, to the desired angular momentum which leads to the tilting of the drive carriage.

Further advantages and features of the invention emerge from the claims and from the description below of a preferred exemplary embodiment of the invention that is illustrated with reference to the drawings.

DETAILED DESCRIPTION

Figure 1:
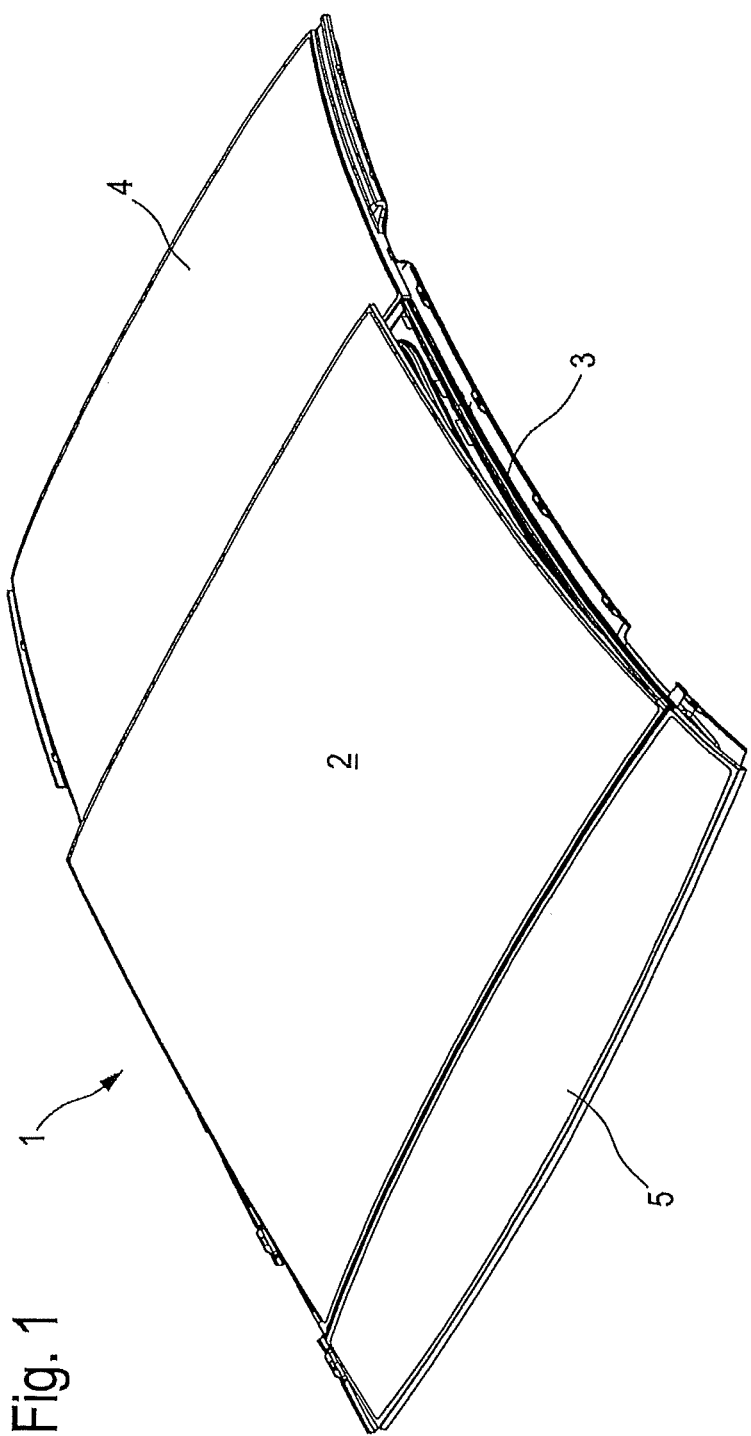
FIG. 1 shows, in a perspective illustration, a roof module for a passenger vehicle, which incorporates an embodiment of a drive system according to the invention.

A roof module 1 according to FIG. 1 has a movable roof part 2 which is mounted movably between a closed position, a ventilation position illustrated in FIG. 1 and an open position which is shifted longitudinally beyond a fixed roof portion 4 of the roof module 1. The movable roof part 2 is carried on opposite longitudinal sides by two carrier strips 6 which each belong to a drive system that is described in more detail below with reference to FIGS. 2 to 14. Each of the two drive systems is accommodated in a carrier frame 3 which carries both the fixed rear roof portion 4 and a front-side panel region 5. The two drive systems are configured functionally identically to each other and are actuated synchronously with respect to each other via a central electric drive motor. The electric drive motor is fastened to the carrier frame 3 below the front-side panel region 5. The drive motor drives two linearly movable drive transmission trains, which are in the form of thread pitch cables, synchronously and in an opposed manner with respect to each other. The drive transmission trains extend in an opposed manner to each other from the drive motor below the panel region 5 to the opposite drive systems and are fixedly connected to one drive carriage 7 each. Each drive transmission train is shifted in a linearly movable manner in opposite directions via the electric drive motor and a suitable transmission. Each drive carriage 7 is mounted in a longitudinally displaceable manner in a guide rail arrangement 8 connected fixedly to the carrier frame 3. Each drive transmission train acts on the respective drive carriage 7 in order to bring about a longitudinal displacement of the drive carriage 7 during a corresponding linear shifting of the drive transmission train.

The left drive system—as seen in the normal direction of travel of the passenger vehicle—is described below with reference to FIGS. 2 to 14. The opposite right drive system is functionally identical, but is furthermore mirror-symmetrical with respect to a vertical center longitudinal plane of the roof module 1. The two drive carriages 7 of the opposite drive systems are moved synchronously and in the same direction with respect to each other in order to obtain a parallel shifting of the opposite carrier strips 6 and thus of the movable roof part 2 between the closed position, the ventilation position and the open position.

The left drive system, as seen in the normal direction of travel, is described below. These statements apply analogously to the opposite drive system. If a tilting claw and an associated latching profiling are described according to the invention, these are provided, in the present embodiment, on both sides and thus for both drive systems. In an embodiment which is not illustrated, only one of the two drive systems has a corresponding tilting claw and at least one associated latching profiling. This suffices in order, in the event of a sharp vehicle deceleration, to permit the movable roof part to be held back in the open position.

Figure 2:
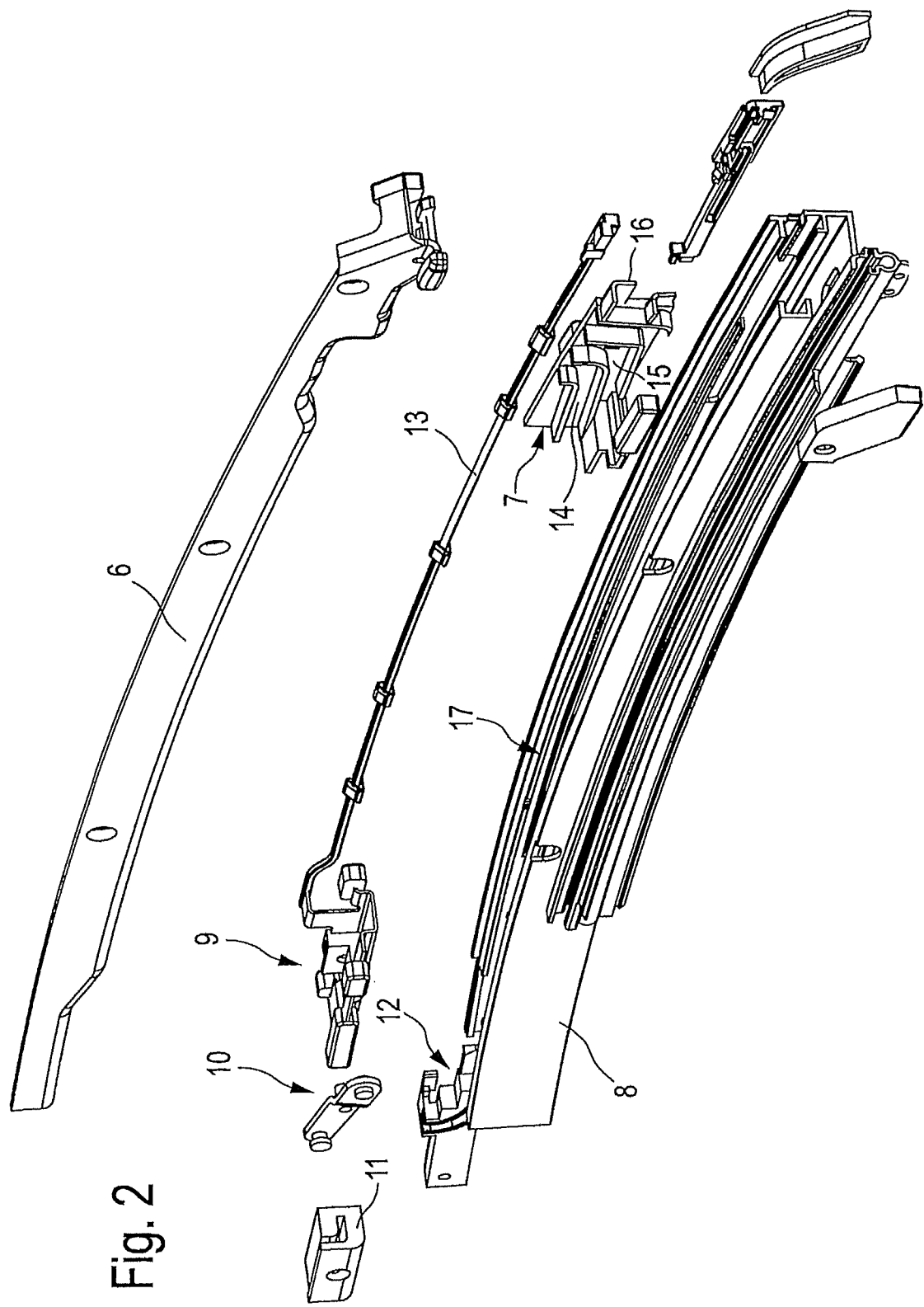
FIG. 2 shows, in a perspective exploded illustration, the drive system for a left drive side of the roof module according to FIG. 1.
Figure 3:
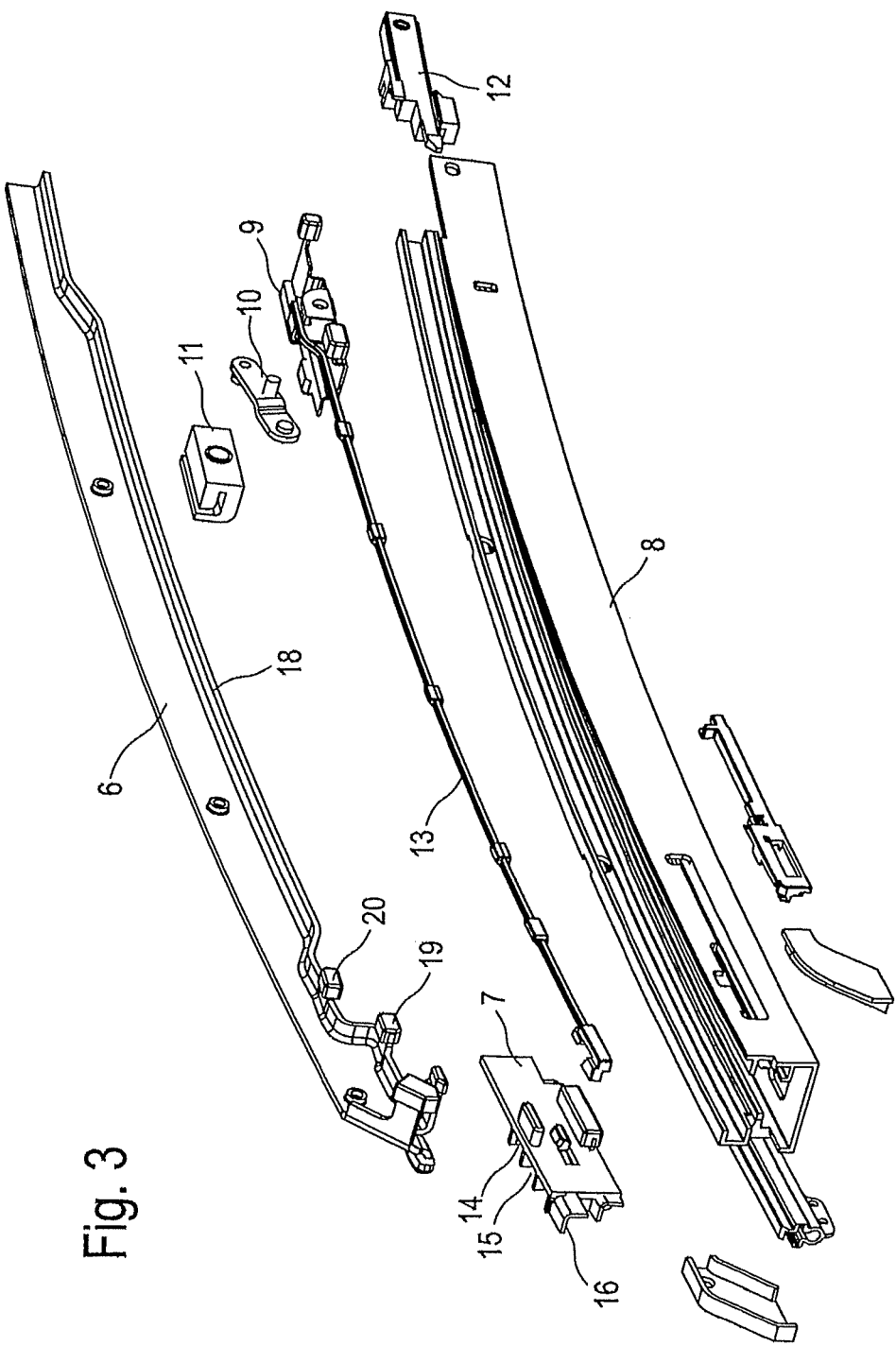
FIG. 3 shows the exploded illustration of the drive system according to FIG. 2 from a different perspective.
Figure 4:
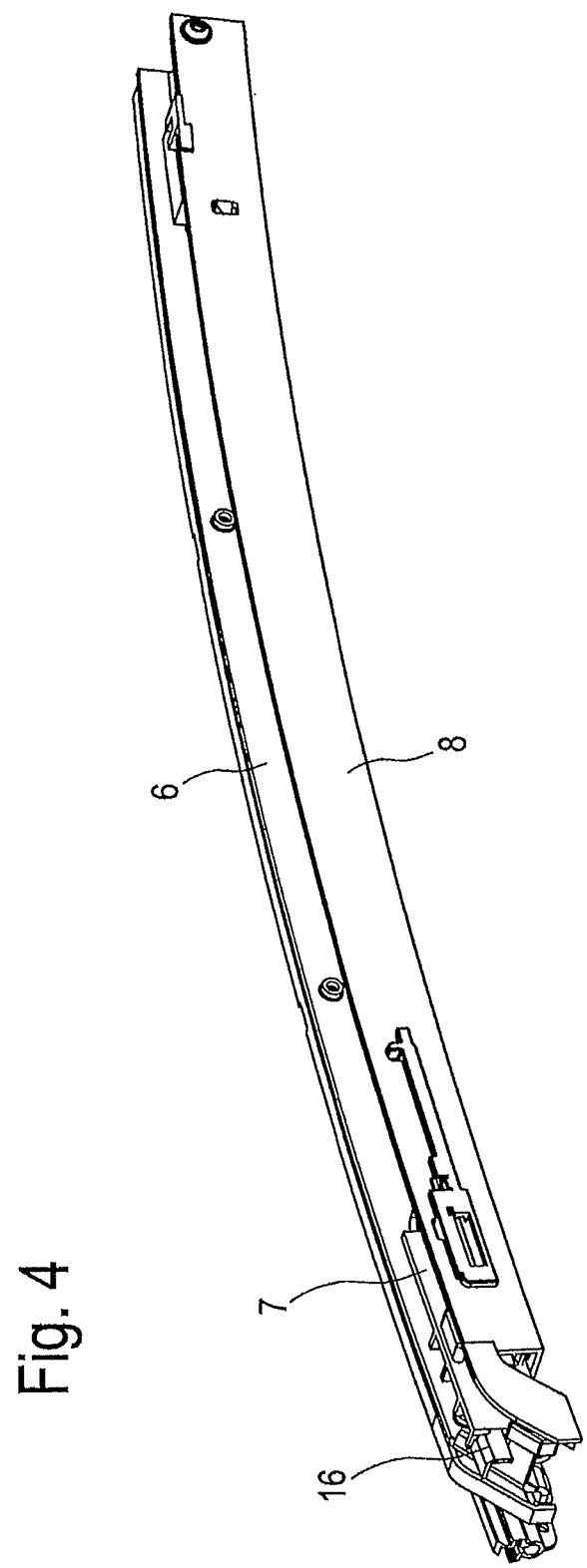
FIG. 4 shows, in a perspective illustration, the drive system according to FIGS. 2 and 3 in a closed position of the movable roof part.
Figure 5:
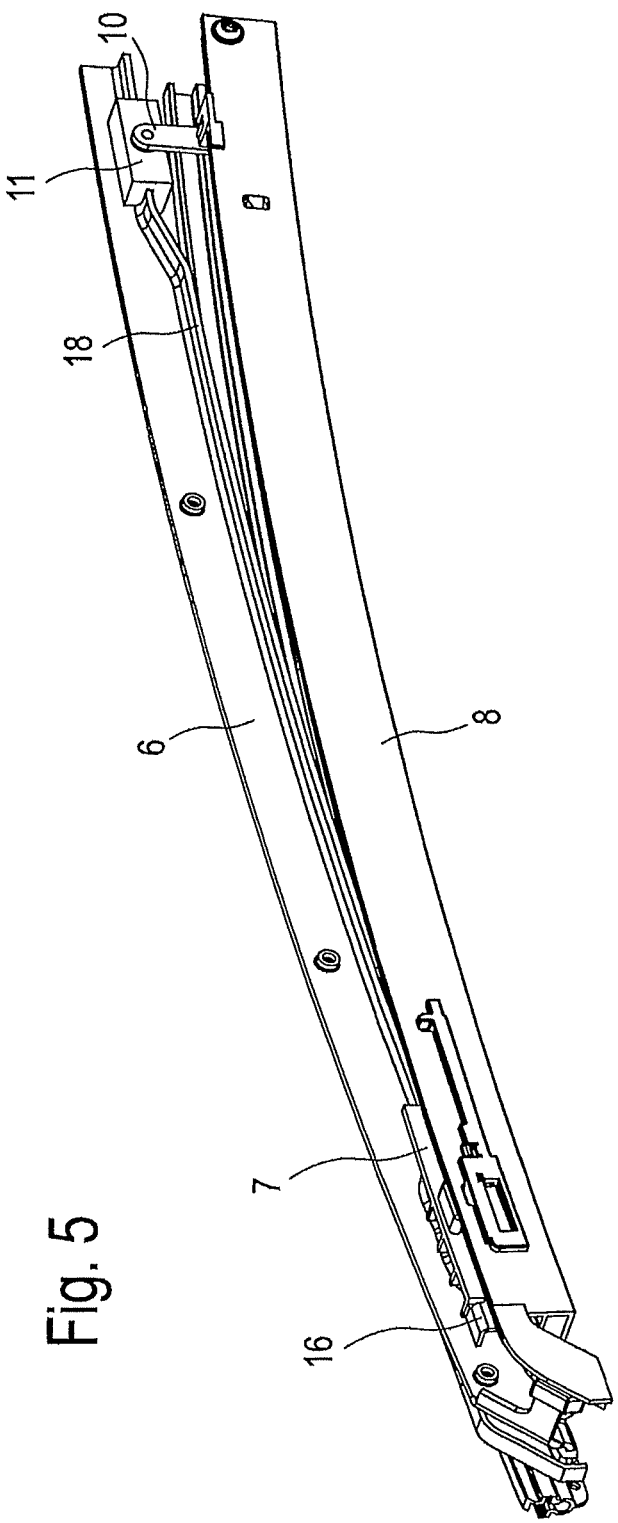
FIG. 5 shows the drive system according to FIG. 4 in a ventilation position corresponding to FIG. 1.

The drive system for the movable roof part 2 has a carrier strip 6 which is fastened releasably to lateral holders in the region of a lower side of the movable roof part 2. The carrier strip 6 is guided in a longitudinally displaceably and height-shiftable manner relative to a guide rail arrangement 8 which is fastened to the carrier frame 3. A control mechanism which has a front-side drive carriage 7 is provided for shifting the carrier strip 6 relative to the guide rail arrangement 8. The drive carriage 7 is connected in a manner not illustrated specifically to a drive transmission train which is laid in the guide rail arrangement 8 and is in the form of a thread pitch cable. Accordingly, a linear shifting of the drive transmission train causes a longitudinal displacement of the drive carriage 7 along the guide rail arrangement 8. In addition, a rear deployment lever 10 acts on the carrier strip 6 via a control slider 11 which engages around a web guide 18 of the carrier strip 6. The lower deployment lever 10 is mounted pivotably on a guide carriage 9 between an upwardly raised functional position and a downwardly deposited inoperative position. The guide carriage 9 is guided in a longitudinally displaceable manner in the guide rail arrangement 8. A coupling rod 13 is fixedly connected to the guide carriage 9, said coupling rod protruding forward in the longitudinal direction and being connected either releasably to the drive carriage 7 or to a side wall of the guide rail arrangement 8 depending on a shifting movement of the drive carriage 7. For this purpose, a securing component 12 which is illustrated in FIGS. 2 and 3 is provided in the corresponding side wall of the guide rail arrangement 8 and is inserted in a form-fitting manner into a corresponding recess in the side wall of the guide rail arrangement 8. Accordingly, the guide carriage 9 is either shifted together with the drive carriage 7 or it is fixed relative to the guide rail arrangement 8.

The carrier strip 6 is coupled in a movement-transmitting manner to the drive carriage 7 via two control cams 19, 20 which are integrally formed on the carrier strip 6 and protrude laterally outward. The drive carriage 7 has a wall which extends in the longitudinal direction and in the vertical direction and on the inner side of which, which faces the carrier strip 6, two control tracks 14 and 15 are provided and, on the opposite outer side of which the coupling rod 13 acts. The two control tracks 14 and 15 form guide channels running obliquely and in a curved manner in the longitudinal direction of the vehicle and in the vertical direction of the vehicle and have transversely protruding channel wall surfaces, wherein the guide channels are open laterally inward and upward in their upper region. A rear control cam 20 of the carrier strip 6 is guided in the control track 14 and a front control cam 19 is guided in the control track 15. In addition, the carrier strip 6 has, at its front end region, a double guide cam, not denoted specifically, which is guided in the region of a corresponding guide track of the guide rail arrangement 8.

As can be seen with reference to FIGS. 2 and 3, the front end region of the drive carriage 7 is also provided with a tilting claw 16 which is designed as an angle piece extending in the vertical direction and in the transverse direction. The tilting claw 16 is part of a sheet metal insert which continues into the region of the vertical wall of the drive carriage 7. The corresponding sheet metal insert is insert molded by a plastics injection molded body which forms a carrier part and forms the two control tracks 14 and 15. The angled tilting claw 16 is connected to the sheet metal insert and thus to the plastics injection molded body of the drive carriage 7 only by a connecting tab which is not denoted specifically and is formed upright and integrally on the sheet metal insert. The tilting claw 16 is positioned in an upper half of the drive carriage 7 and forms a vertical angle leg protruding vertically forward from the connecting tab, and a stiffening leg which protrudes inward from the vertical angle leg at a right angle in the region of the upper side thereof.

Approximately level with the tilting claw 16 in the region of the open position of the guide carriage 7, the guide rail arrangement 8 has latching profilings 17 which are integrally formed on an inwardly facing longitudinal edge of an upper guide track of the guide rail arrangement 8. In the embodiment according to FIGS. 8 to 15, a total of four latching profilings 17 are provided which are designed as latching teeth arranged in a row one behind another. The latching profilings 17 have steeply standing tooth flanks forward in the longitudinal direction and tooth flanks rising to a shallow extent rearward in the longitudinal direction.

Figure 6:
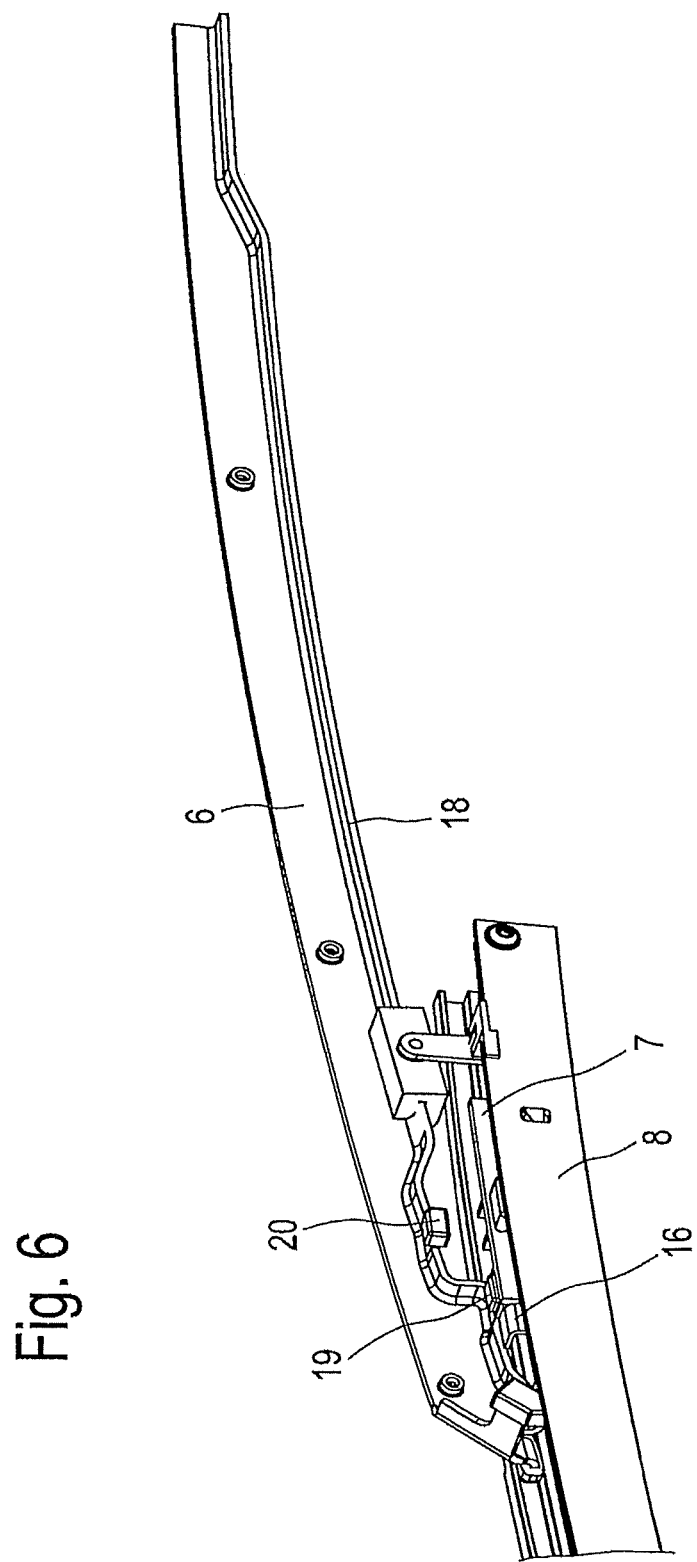
FIG. 6 shows the drive system according to FIGS. 4 and 5 in an open position of a carrier strip which carries a movable roof part of the roof module according to FIG. 1.
Figure 7:
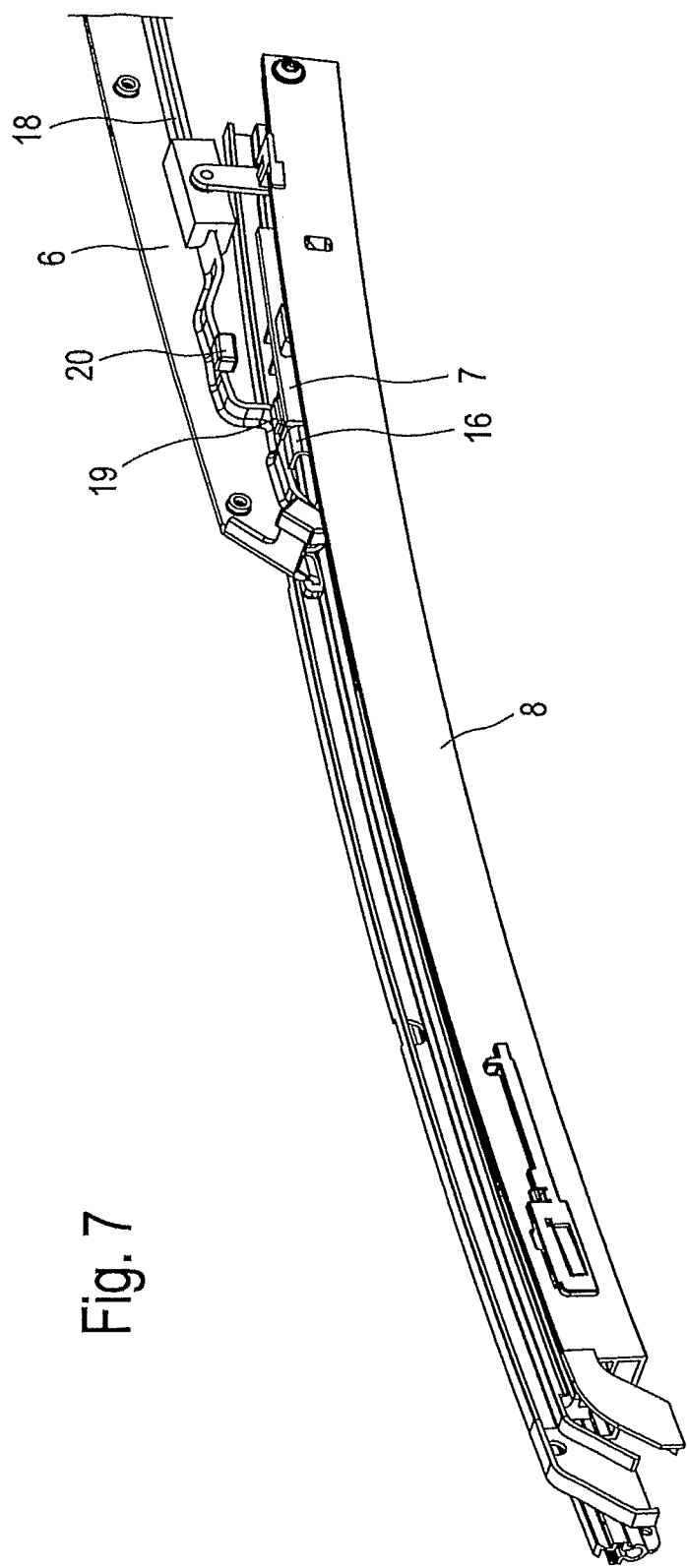
FIG. 7 shows the drive system according to FIG. 6 in the open position, but with a complete illustration of a guide rail arrangement.
Figure 8:
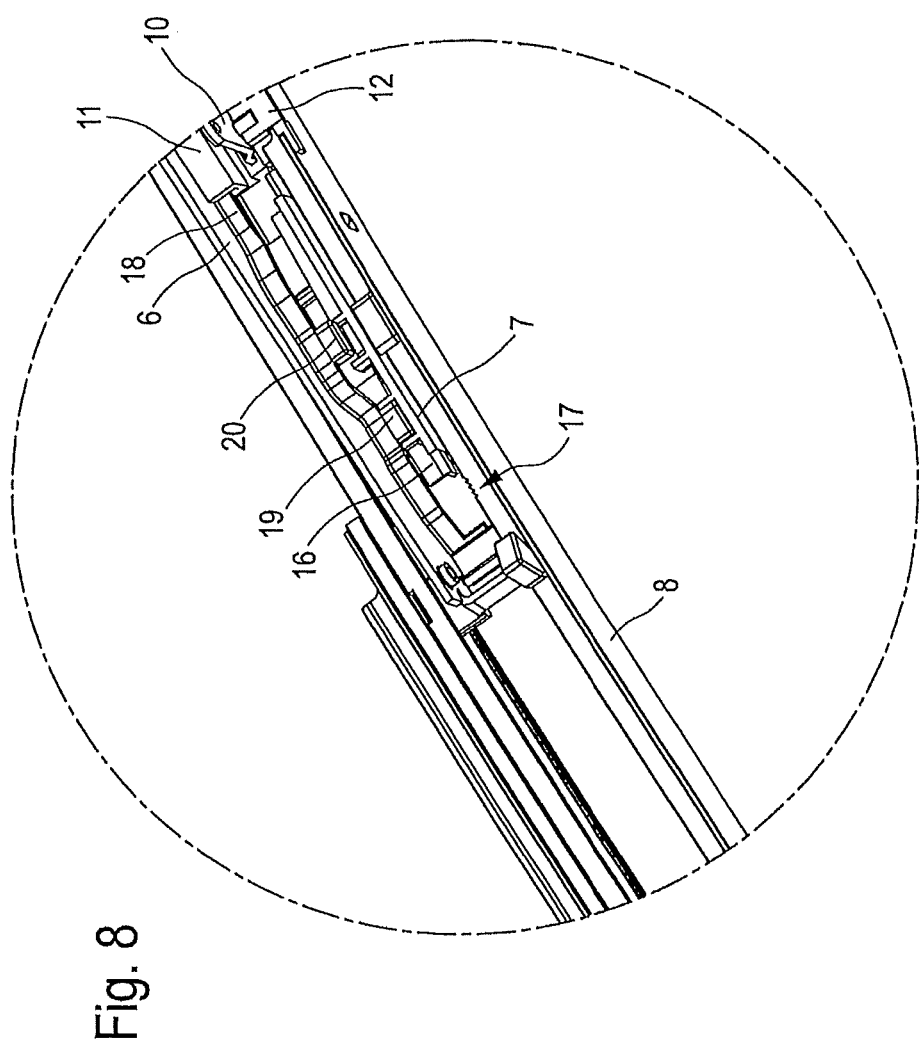
FIG. 8 shows, in an enlarged perspective illustration, a partial region of the drive system according to FIGS. 6 and 7 in the open position of the drive system.
Figure 9:
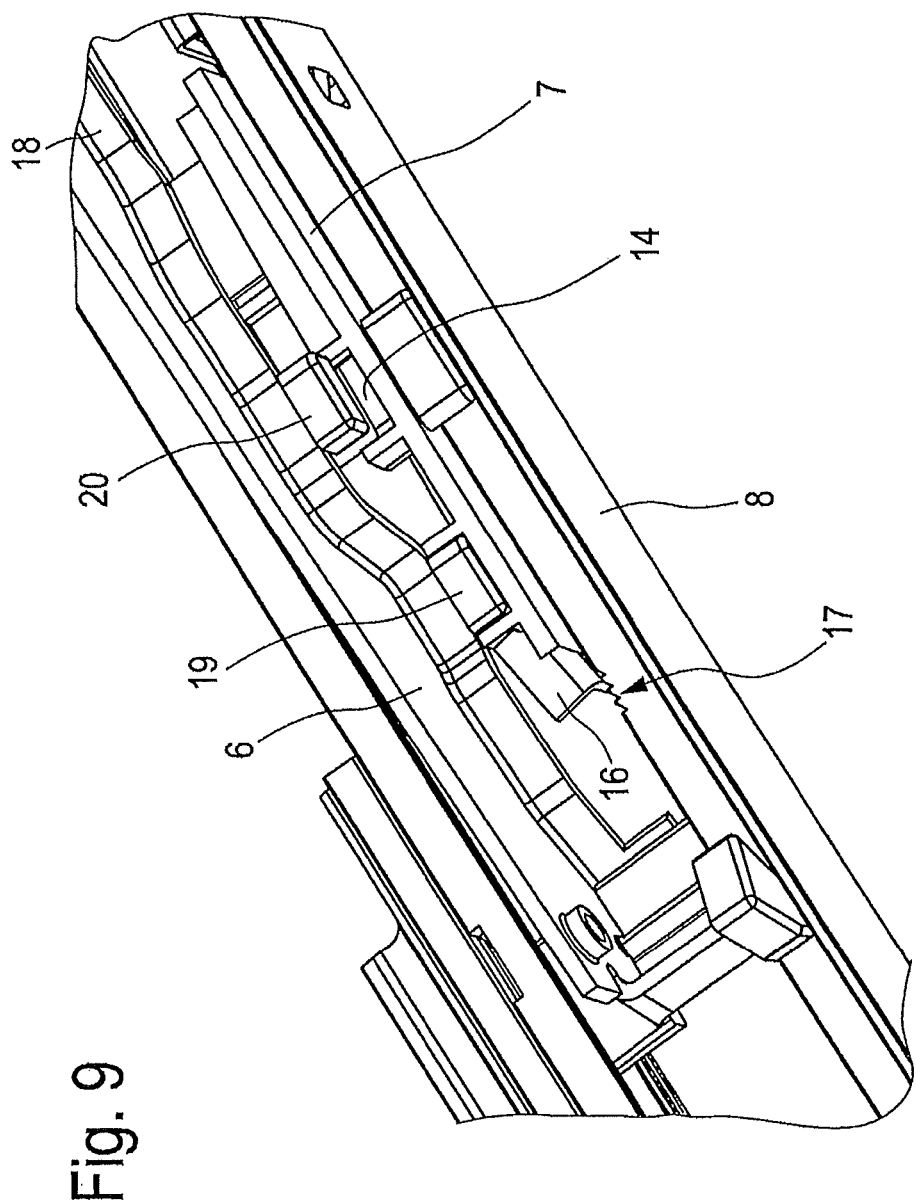
FIG. 9 shows, in an illustration enlarged further, a perspective detail of the illustration according to FIG. 8.
Figure 10:
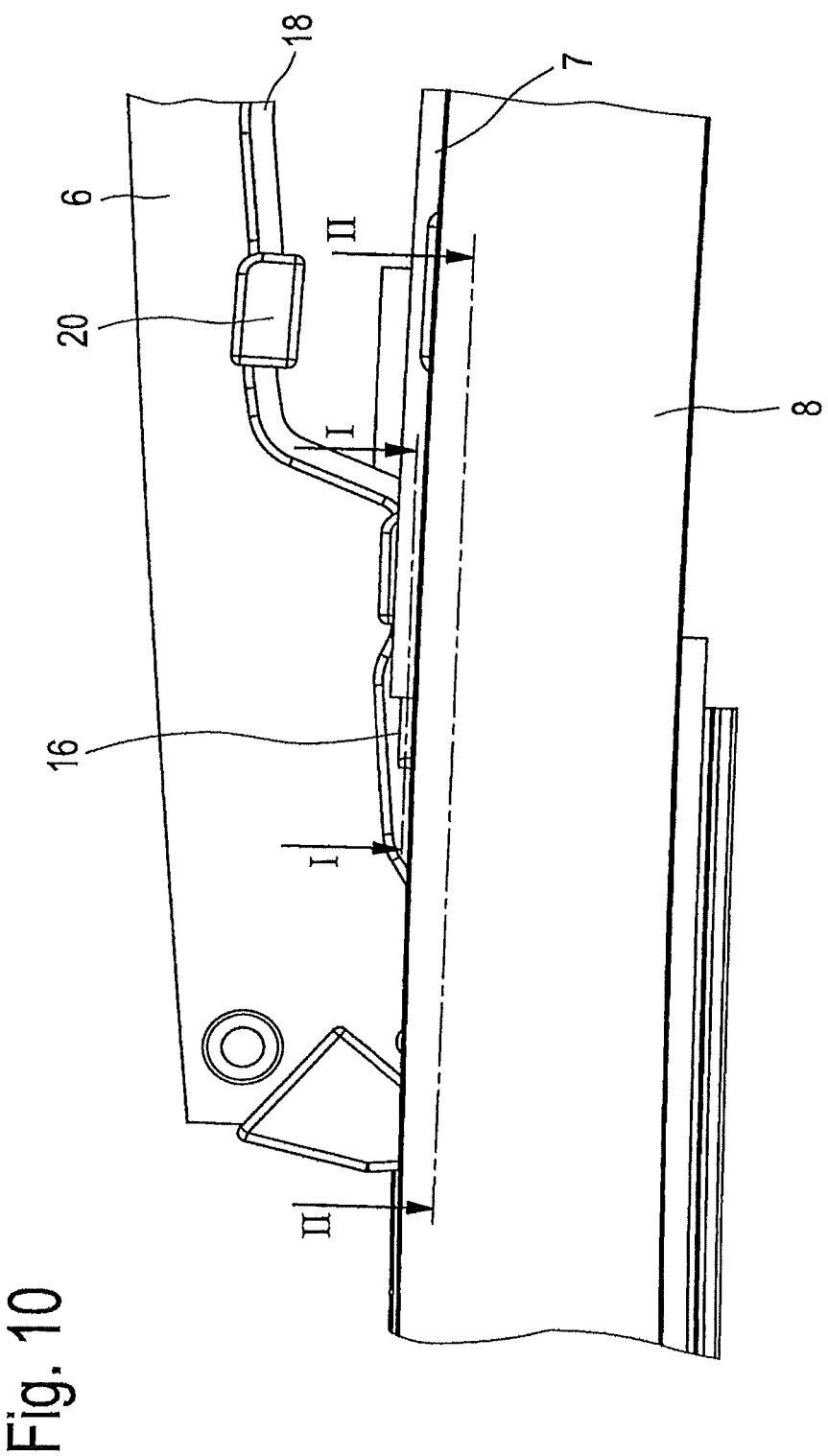
FIG. 10 shows, in a side view, a partial region of the drive system according to FIG. 7 in the open position of the drive system.
Figure 11:
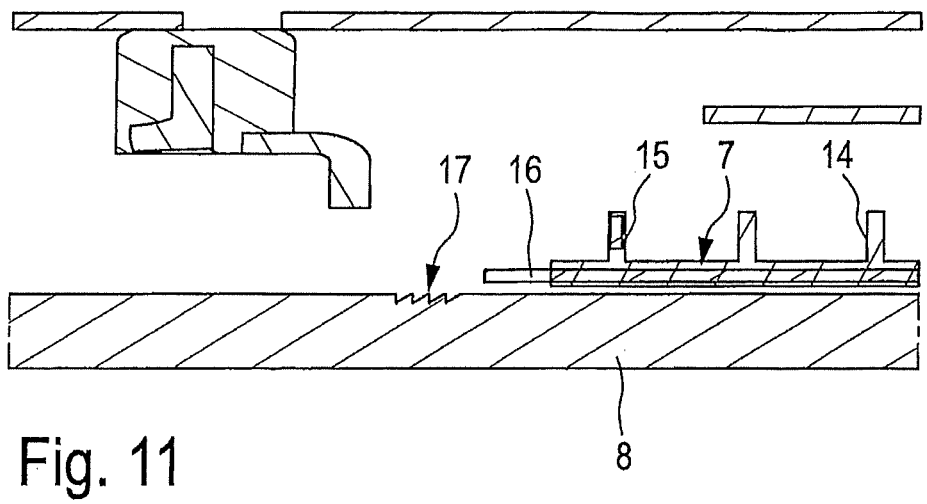
FIGS. 11 and 12 show a sectional illustration along the intersecting line II-II in FIG. 10 in a starting position and in a tilting position.
Figure 12:
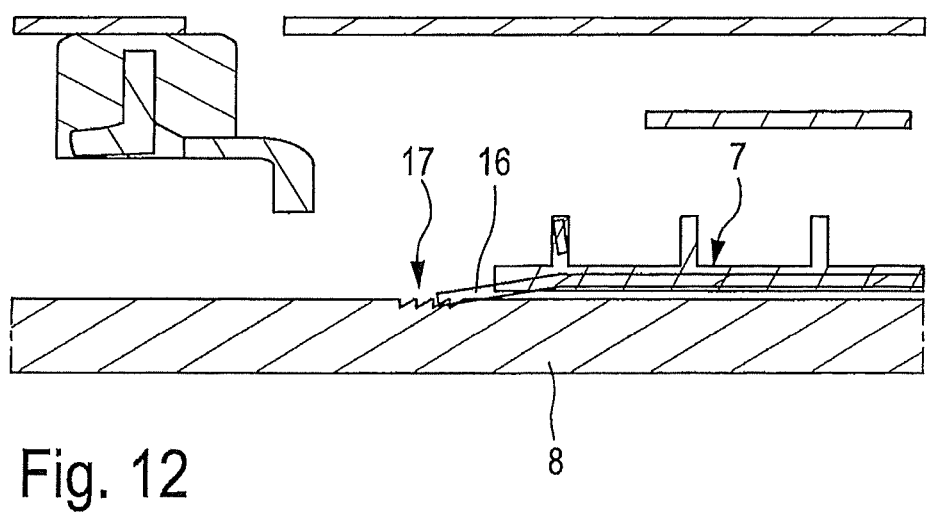
Figure 13:
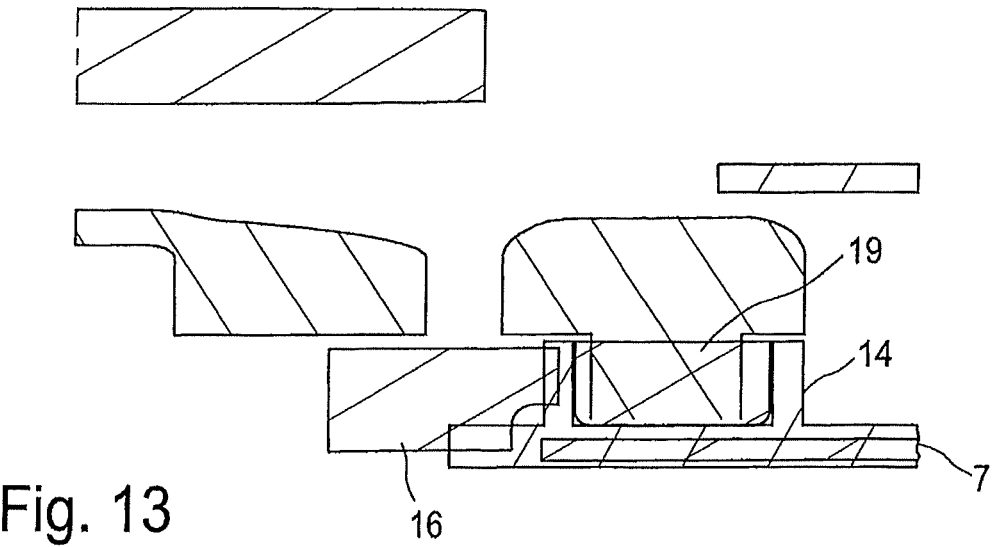
FIGS. 13 and 14 show sectional illustrations along the intersecting line I-I in FIG. 10, likewise in a starting position and in a tilting position.
Figure 14:
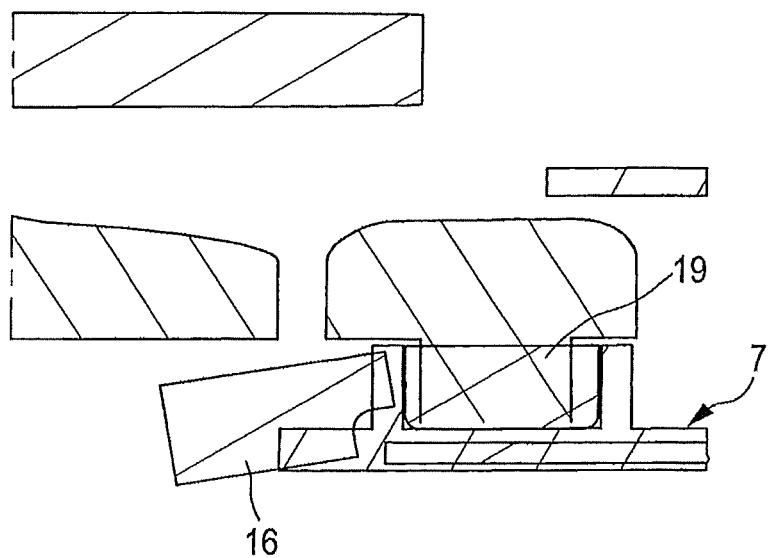
Figure 15:
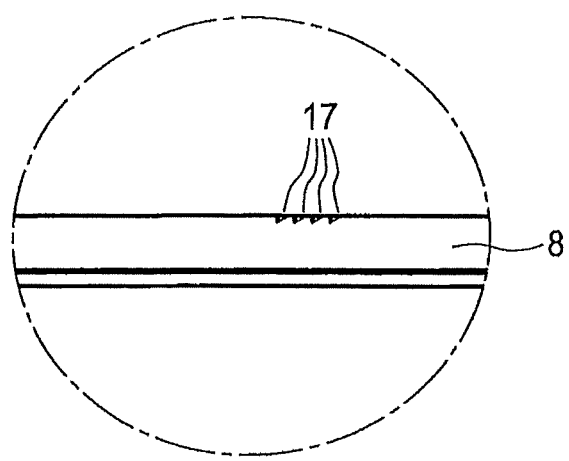
FIG. 15 shows a detail of the guide rail arrangement according to FIGS. 8 and 9 in the region of sawtooth-shaped latching profilings.

It can be seen with reference to FIGS. 6 and 7 that, in the open position of the carrier strip 6, the front control cam 19 of the carrier strip 6 remains trapped in the front control track 15 of the drive carriage 7. The front control cam 19 is held in this position without play in an upper opening region of the front control track 15 and is supported by a front and a rear contact surface of the channel wall of the control track 15—as seen in the direction of longitudinal extent of the guide rail arrangement 8. In the region of the position of the drive carriage 7 relative to the guide rail arrangement 8 in the open position of the carrier strip 6, a row of latching profilings 17, which have already been described previously, is assigned to a front end region of the drive carriage 7. The latching profilings 17 are provided on a longitudinal edge of the upper guide track of the guide rail arrangement 8 and are molded integrally in said longitudinal edge. The latching profilings 17 face inward in the transverse direction with respect to the drive carriage 7. The latching profilings 17 are positioned at a small distance in front of a front end region of the drive carriage 7 and thus in front of the tilting claw 16 when the drive carriage 7 is in the open position of the carrier strip 6. In the normal operating state, the tilting claw 16 and the latching profilings 17 are spaced apart from each other. If then, according to FIGS. 9 and 12 and 14, a sharp vehicle deceleration, in particular a vehicle impact, causes forces of inertia to act on the movable roof part 2 in the open position of the movable roof part 2 and to move the movable roof part 2 relative to the opposite guide rail arrangements 8 at a high acceleration forward in the direction of the closed position, then said longitudinal acceleration is transmitted via the respective carrier strip 6 and the control cam 19, which is trapped in the control track 15 of the drive carriage 7, to the drive carriage 7. A small amount of play in the guide for the drive carriage 7 within the guide rail arrangement 8 in the transverse direction, said small amount of play being necessary because of the slideability of the drive carriage 7, causes the drive carriage 7, because of the momentum introduced via the control cam 19, to twist slightly about a vertical axis within the guide rail arrangement 8, as a result of which the tilting claw 16 enters into engagement with the latching profilings 17. The vertical axis is defined by an imaginary vertical axis extending through a center of gravity of the drive carriage 7. The control cam 19 and the corresponding wall surfaces of the control track 15 are eccentric with respect to said vertical axis, thus resulting in a torque momentum which rotates the drive carriage 7 outward in the region of its front end region. This results in the desired interlocking of the tilting claw 16 with the latching profilings 17. The resulting blocking of the drive carriage 7 inevitably also leads to blocking of the carrier strip 6 in the longitudinal direction of the guide rail arrangement 8 and accordingly to blocking of the movable roof part 2.

Figure 16:
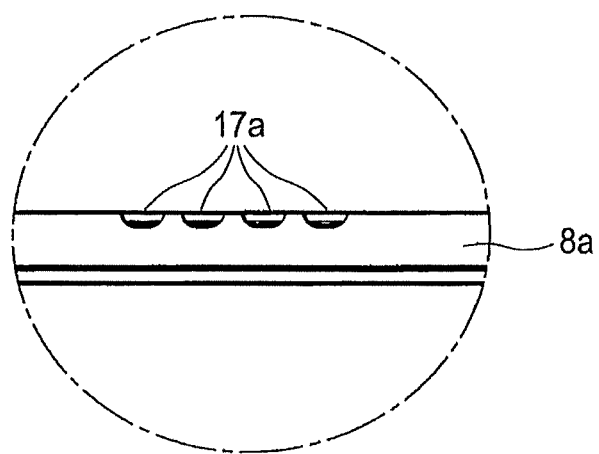
FIG. 16 shows a further embodiment of a guide rail arrangement similar to FIG. 15, with a series of latching profilings which are configured as trough-like depressions.
Figure 17:
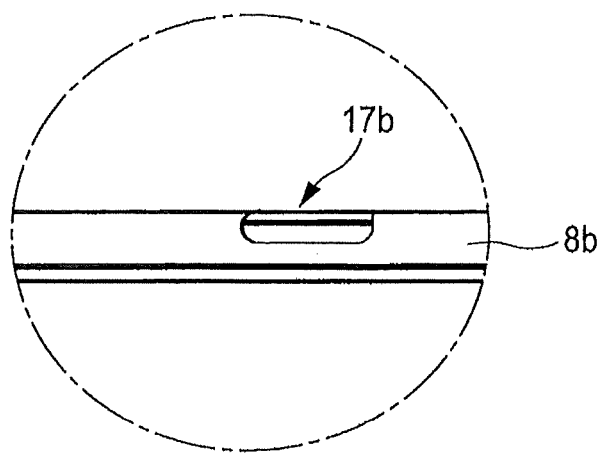
FIG. 17 shows a further embodiment of a guide rail arrangement with an individual latching profiling which is designed as a channel-like longitudinal groove.

Instead of the latching-tooth-shaped latching profilings 17 according to FIGS. 9 to 15, one guide rail arrangement 8a may also have latching profilings 17a that are designed according to FIG. 16. Alternatively, according to FIG. 17, only one individual latching profiling 17b can be provided in one guide rail arrangement 8b, said latching profiling being designed in the manner of a channel-shaped longitudinal groove and, forward in the longitudinal direction of the guide rail arrangement 8b, having an arcuate end wall which is designed in the manner of a pocket and thus forms a form-fitting retainer for a corresponding tilting claw of a drive carriage. The guide rail arrangements 8a and 8b are otherwise designed identically to the guide rail arrangement 8. The other drive system is also designed in the same manner as the drive system which has been described in more detail with reference to FIGS. 2 to 15.

The invention claimed is:

1. A drive system for a movable roof part of a roof module of a motor vehicle having a guide rail arrangement fixed to the roof module, the drive system having a control mechanism movable in the guide rail arrangement for shifting the movable roof part between a closed position, a ventilation position and an open position, the control mechanism being operatively connected to the movable roof part and having a drive carriage connected to a drive transmission train, wherein a tilting claw is provided on the drive carriage, and a wall portion of the guide rail arrangement is provided with at least one latching profiling positioned in a region of the guide rail arrangement and facing the guide carriage, wherein when the drive carriage is positioned in the open position of the movable roof part, the at least one latching profiling interacts with the tilting claw in a form-fitting manner when the drive carriage is tilted.

2. The drive system as claimed in claim 1, further including a carrier strip for the movable roof part, said carrier strip being mechanically coupled to the drive carriage by a coupling member which acts eccentrically on the drive carriage in such a manner that, in an installed state of the drive system ready for operation, in the event of a sharp acceleration of the movable roof part the drive carriage tilts about a vertical axis and causes the tilting claw to interact with the at least one latching profiling.

3. The drive system as claimed in claim 1, wherein the tilting claw is configured as a sheet metal insert in a carrier part of the drive carriage, wherein the sheet metal insert protrudes at least in sections out of the carrier part in a longitudinal direction.

4. The drive system as claimed in claim 1, wherein the tilting claw protrudes from a carrier part forward in a longitudinal direction—as seen in an orientation of the drive carriage when ready for operation.

5. The drive system as claimed in claim 1, wherein the at least one latching profling comprises a a row of latching teeth oriented in a longitudinal direction of the guide rail arrangement, said row of latching teeth being formed integrally on the wall portion of the guide rail arrangement.

6. The drive system as claimed in claim 2, wherein the carrier strip includes a control cam and the guide carriage includes a carrier part, the carrier part including a control track, the control track opening toward the carrier strip and being arranged laterally on the carrier part of the guide carriage, the control cam protruding into the control track and comprising the coupling member of the carrier strip.

7. The drive system as claimed in claim 6, wherein the control track has at least one channel wall surface protruding transversely with respect to a wall of the carrier part that extends in a vertical direction, the control cam lying against the at least one channel wall surface in the open position of the roof part.

8. A roof module having at least one drive system as claimed in claim 1.

* * * * *